Oct. 16, 1934.  M. H. TONCRAY  1,977,599

VEHICLE BODY WINDOW

Filed Sept. 6, 1933  2 Sheets-Sheet 1

Inventor:
Millard H. Toncray
by Mason, Calvert, Copeland & Pike.
Attys.

Oct. 16, 1934.  M. H. TONCRAY  1,977,599
VEHICLE BODY WINDOW
Filed Sept. 6, 1933  2 Sheets-Sheet 2
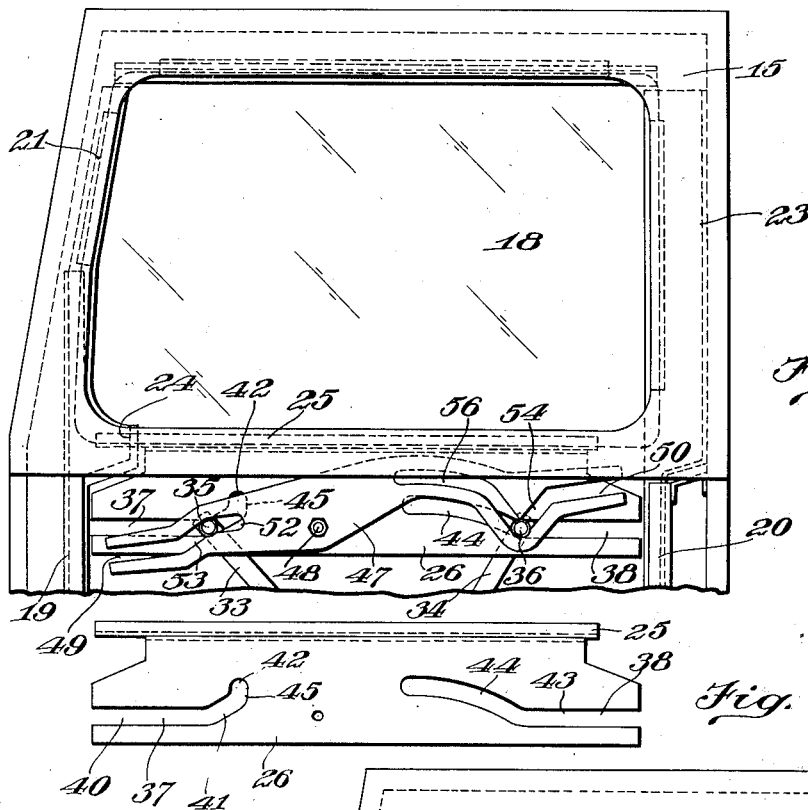
Fig. 5.
Fig. 7.
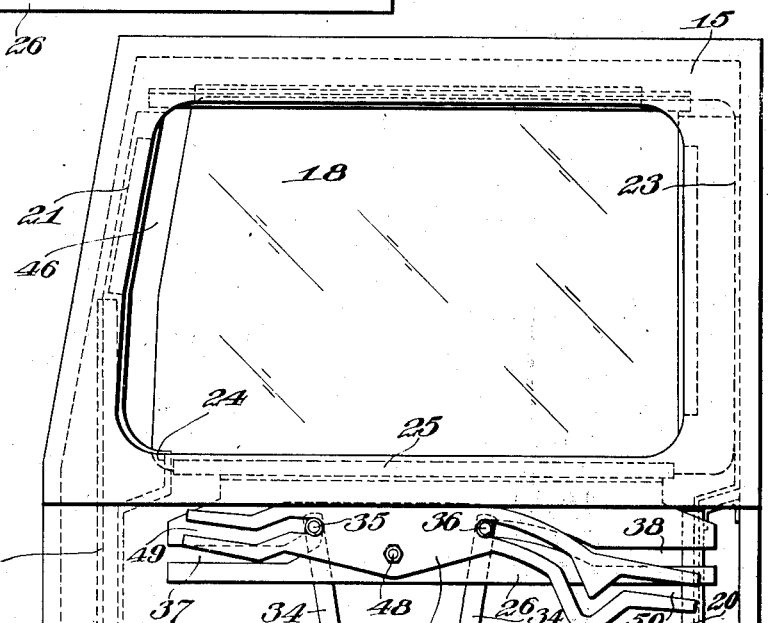
Fig. 6.
Fig. 8.
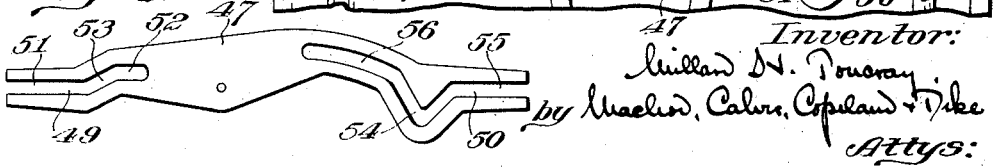
Inventor:
Millard H. Toncray
by MacLeod, Calver, Copeland & Dike
Attys.

Patented Oct. 16, 1934

1,977,599

UNITED STATES PATENT OFFICE 1,977,599

VEHICLE BODY WINDOW

Millard H. Toncray, Detroit, Mich., assignor, by mesne assignments, to Automobile Ventilation, Inc., Detroit, Mich., a corporation of Michigan Application September 6, 1933, Serial No. 688,344

28 Claims. (Cl. 296—44)

This invention relates to ventilating windows for vehicle bodies, especially automobile bodies, an object of the invention being to provide an improved window structure and operating mechanism whereby the window glass is adapted to be raised and lowered within a window opening and also to be shifted horizontally or longitudinally in the plane of the glass into and out of position to provide a ventilating slot or opening at one upright edge, preferably the forward edge, of the glass when the latter is in an elevated position.

A further object of the invention is to provide a ventilating window structure of the foregoing type for vehicle bodies wherein improved mechanism having a single manual control is provided for both raising and lowering the window glass and shifting the glass horizontally, or transversely of its vertical path of movement, in the plane of the glass and in opposite directions into and out of position to provide a ventilating slot or opening at preferably the forward edge of the glass.

A further object of the invention is to provide means, cooperating with and controlled by the regulator mechanism, for locking or blocking the window glass against movement, particularly lateral movement from its closed position, except through said mechanism, whereby unauthorized access to the vehicle is prevented when the window is closed and the doors of the body locked.

The foregoing and other objects of the invention will best be understood from the following description of an illustrative embodiment thereof shown in the accompanying drawings. It will be understood, however, that the particular construction described and shown has been chosen for purposes of exemplification merely, and that the invention, as defined by the claims hereunto appended, may be otherwise embodied without departure from the spirit and scope thereof.

In said drawings:

Figs. 5 and 6 are views similar to Fig. 1 showing the window in fully closed and ventilating positions, respectively.

Fig. 7 is a detail view of the carrier plate for the glass panel.

Fig. 8 is a similar view of the locking plate.

Figures 1, 2:
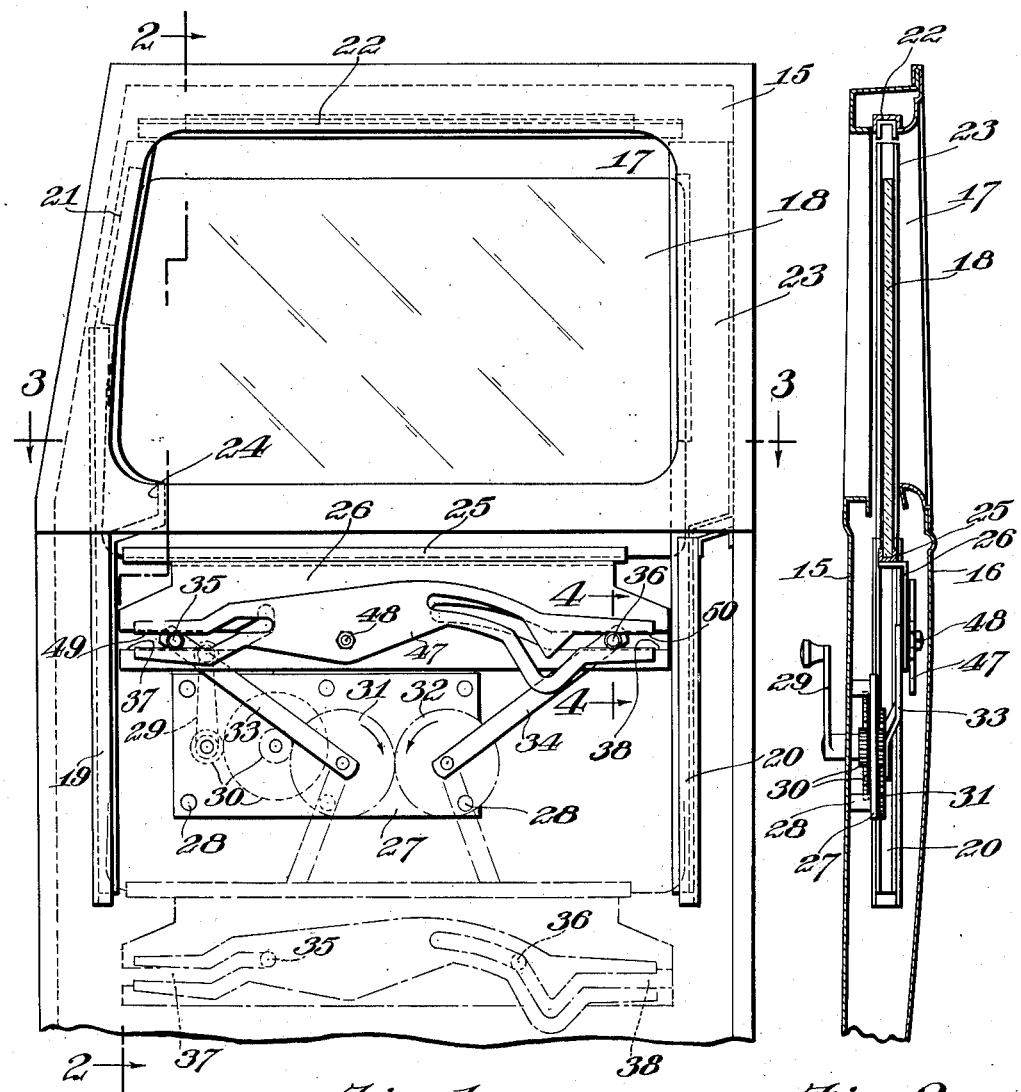
Fig. 1 is an elevation of a vehicle body door provided with a window and operating mechanism embodying the invention, the outer panel of the door being omitted, and the window glass panel being shown in partly lowered position.
Fig. 2 is a vertical section, taken substantially on the line 2—2 of Fig. 1, but including the outer panel.
Figure 3:
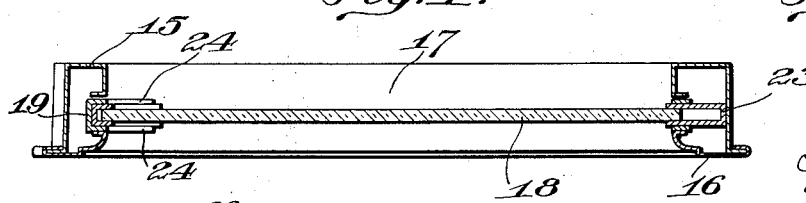
Fig. 3 is a similar horizontal section taken substantially on the line 3—3 of Fig. 1.

The invention is herein shown as applied to one of the front doors of a closed motor vehicle body, said door comprising suitably formed and connected inner and outer panels 15 and 16 which are cut out in their upper portions and suitably shaped to provide the usual window opening 17 adapted to be closed by a sliding glass panel 18 located between said door panels. The panel 18 is guided for vertical movement in upright glass runways or channels 19 and 20 suitably secured in place between the panels 15 and 16, or otherwise in accordance with the usual practice. Where, as in the construction shown, the forward edge of the door is rearwardly inclined, an additional channel 21 may be provided to receive the upper portion of the forward edge of the glass panel 18 when the latter is fully raised to close the window. At the upper edge of the window opening 17 is provided a horizontally disposed run or channel 22 to guide the panel 18 for lateral or rearward movement from its closed position, shown in Fig. 5, into the ventilating position, shown in Fig. 6, the run 20 being formed with a pocket or deepened portion 23 to receive the rear edge of said panel, and the run 19 being provided with extensions 24 to brace the forward edge thereof when so moved.

Figure 4:
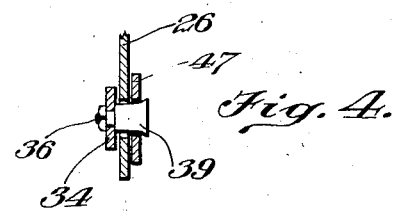
Fig. 4 is a fragmentary detail section taken on the line 4—4 of Fig. 1.

Secured to the lower edge of the glass panel 18 is a glass retainer member which in the present instant comprises a channel 25 to which is secured a carrier in the form of a metal plate or strip 26 adapted to cooperate with the regulator mechanism and operatively connect the latter with the window glass. Said regulator mechanism is supported by the usual regulator board or mounting plate 27 suitably secured, as by screws 28, to the inner panel 15 between the latter and the outer panel 16, and comprises a crank 29 located at the inner side of the door and having a shaft connected by suitable reduction gearing 30 with one of a pair of intermeshing gears 31 and 32, respectively, provided with rigidly attached, radially disposed arms 33 and 34. The arms 33 and 34 carry at their free ends studs 35 and 36 which cooperate with generally horizontally disposed slots 37 and 38 in the carrier or retainer plate 26, said studs being preferably provided with anti-friction rollers 39 shown most clearly in Fig. 4. Referring particularly to Fig. 7, the slot 37 at the forward end of the plate 26 comprises a substantially straight horizontal portion 40 communicating with a relatively short, inclined cam-like or arcuate portion 41, which in turn terminates in a short, substantially vertical portion 42. The slot 38 at the rear end of the plate 26 comprises a substantially straight horizontal portion 43 substantially equal in length to the corresponding portion 40 of the slot 37 and communicating with an arcuate portion 44 of considerably greater length than the arcuate portion 41 of the slot 37.

In Fig. 1, for clearness of illustration, the parts are shown in full lines in the positions assumed thereby when the panel 18 is partly lowered, but certain of them are also shown in dotted lines in the positions assumed thereby when said panel is in its lowermost position to open the window completely. In order to raise the panel 18 and close the window, the crank 29 is turned in the proper direction to cause the gears 31 and 32 to be rotated in the opposite directions indicated by the arrows thereon, thereby swinging the arms 33 and 34 in unison vertically, first (when the operation starts from the fully lowered position shown in dotted lines) away from one another and thereafter toward one another, and causing the studs 35 and 36 to travel outwardly and then inwardly in their respective slots 37 and 38, the vertical components of the paths of movement of said studs causing the carrier plate 26, and consequently the glass panel 18, to be raised. Obviously, rotation of the crank 29 in the opposite direction will cause the panel 18 to be lowered from a raised position.

When the panel 18 is fully raised to close the window, the parts assume the position shown in Fig. 5. At this time the stud 35 is at the junction of the portions 40 and 41 of the slot 37, while the stud 36 is at the junction of the portions 43 and 44 of the slot 38. Continued operation of the crank 29 in the direction above referred to causes the studs 35 and 36 to move idly in the arcuate portions 41 and 44 of the slots 37 and 38 (this idle movement being provided for a reason hereinafter explained) until the stud 35 reaches the end wall or edge 45 of the portion 41 of the slot 37, whereupon the horizontal component of the continued movement of said stud causes said stud, by engagement with said wall, to move the carrier plate, and consequently the glass panel, laterally or rearwardly into the position shown in Fig. 6 to provide a ventilating opening 46 at the forward edge thereof and between said edge and the forward edge of the window opening 17. During this movement of the stud 35, the corresponding continued movement of the stud 36 in the opposite direction is permitted by the excess length of the arcuate portion 44 of the slot 38, while the incidental vertical component of the movement of the stud 35 is accommodated by the vertical portion 42 of the slot 37, thereby providing for a horizontal movement of the panel notwithstanding the arcuate paths of movement of the studs 35 and 36.

It will be understood that, the crank 29 being located at the inner side of the door, the regulator mechanism is inaccessible from the exterior of the vehicle when the doors are locked and the windows closed. In order to assist in preventing unauthorized access to the vehicle by opening the window from the exterior, particularly by applying force to the windows to slide the same rearwardly, as might otherwise be possible due to the generally horizontal disposition of the slots 37 and 38, means in addition to the cam slots 41 and 44 are provided for preventing movement of the panel 18 from the closed position, shown in Fig. 5, except by means of the regulator mechanism. As shown, said means comprises a locking member or plate 47 pivoted intermediate its ends, as by means of a bolt 48, to the carrier plate 26. The locking plate 47 is provided with slots 49 and 50 which likewise receive the studs 35 and 36 respectively. Referring particularly to Fig. 8, the slot 49 comprises outer and inner substantially straight offset portions 51 and 52 connected by an inclined portion 53. The slot 50 comprises a V-shaped portion 54 communicating at its ends with oppositely extending portions 55 and 56, the former being substantially straight and the latter of arcuate form. When the window is fully closed, as shown in Fig. 5, the stud 36 occupies a position in the bottom or apex of the V-shaped portion 54 of the slot 50, while the stud 35 occupies a position at the junction of the portions 52 and 53 of the slot 49.

It will be seen that the window glass will be substantially fully raised during the travel of the studs 35 and 36 in the horizontal slot portions 40 and 43. With the window in fully raised position a desirable amount of free or lost motion of the regulator handle is permitted since the travel of stud 35 in cam slot portion 41 and of stud 36 in a corresponding portion of slot 44 will not shift the glass owing to the concentricity of these slot portions with the arms 33 and 34. Thus, the regulator handle is free to be moved in a closing direction, such as one half or three quarters of a turn, after the glass is fully raised, without moving the glass horizontally. The edges of the slot portions 41 and 44, however, engage the studs and provide a positive means for blocking the glass against independent horizontal movement, as when a force is applied to the glass except when the regulator is operated.

It will be noted that a straight horizontal movement of the glass in opposite direction is provided through cooperation of the stud 35 with the opposite upright edges of the vertical slot 42, this slot being sufficiently deep to provide a degree of lost motion so as to accommodate the vertical component of the movement of the stud. The opposed upright edges or sides of the slot 42 thus provide stops effective by engagement with stud 35 to shift the glass horizontally in its plane in opposite directions into and out of ventilating position. Hence, when the glass is shifted horizontally there is no vertical displacement thereof within the header channel 22.

The oscillatable bar 47 provides a controlling member for controlling and determining the proper relative positions of the studs 35 and 36 in the slots 37 and 38, and for locking the glass against tilting or cocking movement. While the glass is guided at opposite edges within the lower runways 19 and 20, it will be held thereby against tilting movement in the plane of the glass. However, after the glass has traveled out of these runways to such an extent that these guides do not effectively support it, there is a definite tendency of the glass to cock and tilt, thereby moving out of true relation to the window runways and shifting the position of the studs in the slots 37 and 38 to such an extent that operation of the regulator is impaired. The foregoing difficulties are overcome by means of the controlling bar 47. The slots in this bar are so designed as to positively maintain the window glass against any oscillatory or tilting movement. In effect the slotted bar 47 in cooperation with the slotted bar 26 provide a scissors lock whereby the studs are frictionally clamped against any independent movement of the window relatively to the regulator mechanism. Thus, it is possible by means of a two point support, when the glass is free of the side runways, to hold the glass rigidly against both independent horizontal and tilting movement. Furthermore, it will be seen that by virtue of this construction it is not necessary to depend upon the pressure of the upper edge of the glass in the bottom of the header channel 22 to keep the glass against cocking or tilting. The present construction is thus advantageous not only in various types of closed bodies but particularly in convertible bodies.

Owing to the inwardly recessed position of the glass 18 between the outwardly protruding pillars 15, a low pressure zone is created immediately in rear of the front pillar during the forward travel of the vehicle. The front jutting pillar thus forms a baffle, deflecting the air stream away from the ventilating opening or gap 46 and, due to the creation of this low pressure zone in the locality of the opening 46, air will be drawn through the opening from the interior of the vehicle by suction.

I claim:

1. The combination of a vehicle window, a runway therefor, and regulator mechanism for raising and lowering said window, said mechanism comprising means for moving the window rearwardly in the plane of the window when the window is in raised position to provide a ventilating opening between the front vertical edge thereof and the runway whereby air may be drawn from the inside of the vehicle through said opening, and said last means positively moving the window forwardly in the plane of the window to normal position.

2. Mechanism for operating a vehicle window comprising regulator means for raising and lowering the window, and means providing a connection between said regulator means and window for enabling said regulator means positively to move the latter horizontally in the plane of the window in one direction when the window is in raised position to provide a ventilating opening whereby air may be drawn from the inside of the vehicle through said opening and positively to move the window in the opposite direction in the plane of the window to normal position.

3. In a vehicle body, the combination of a window frame arranged in a side wall portion of the body, a sliding window glass in said frame adapted to be moved vertically or substantially so into and out of a closed position, said window glass being mounted so as to be capable of being moved horizontally in the plane of the glass to produce a ventilating slot for the purpose described at one upright edge of the window, and a channel or groove in the window frame for receiving the other upright edge of the window, said channel being of sufficient depth to provide for the horizontal sliding movement of the window in its plane when moved into ventilating position, and also to serve as a housing for the rear edge portion of the window when the window is moved out into position to close said ventilating slot, and regulator mechanism having a single manual control for moving the glass vertically and also horizontally in its plane in opposite directions.

4. In combination with a vehicle window mounted for vertical movements, a unitary regulator assembly for raising and lowering said window, means engageable by said regulator assembly after said window is in raised position for effecting horizontal movement thereof in the plane of the window upon further actuation of said regulator assembly thereby to provide a ventilating opening through which air may be withdrawn from the vehicle, and means engageable by said regulator assembly upon actuation thereof in the opposite direction for positively moving said window horizontally in the plane of the window in the opposite direction.

5. In a regulating mechanism for a window having vertical and transverse movements, the combination of a member adapted to be mounted on the lower portion of a window, a regulator having a swinging arm engaging said member for raising and lowering same, a stop engageable by said arm when the window is in raised position for moving said member horizontally in one direction thereby to move the window laterally in the plane of the window to provide a ventilating opening, and a second stop engageable by said arm upon swinging movement thereof in the opposite direction for returning said member to normal position whereby the window is returned to closed position.

6. The combination of a vehicle window, a runway therefor, regulator mechanism for raising and lowering said window and moving the same transversely in the plane of the window in opposite directions when the window is raised thereby to provide and close a ventilating opening through which air may be withdrawn from the vehicle, and a single manual control for said mechanism.

7. The combination of a window, a runway therefor, regulator mechanism for raising and lowering said window, moving the same rearwardly in the plane of the window when the window is raised to provide a ventilating opening between the front vertical edge thereof and the runway and moving the same forwardly to normal position, said mechanism including a swinging arm and a pair of stops engageable successively by said arm when the window is raised for positively moving the window forwardly or rearwardly, and a single manual control for said mechanism.

8. In a vehicle body, the combination of a window formed from a piece of glass, a frame for said window constructed so as to maintain a substantially tight joint between the front edge of the window and the front upright member of the frame, means for moving the window vertically or substantially so, means for moving said window horizontally in the plane of the glass to produce a ventilating opening adjacent the front edge of same through which air is sucked from the interior of the body by the natural vacuum produced on said ventilating opening by external air currents, when the vehicle is moving forwardly, means for moving said window horizontally in its plane to cut off the escape of air from the body through said ventilating opening, and a single manual control means for all of said means.

9. In a vehicle body, the combination of a sliding window mounted so as to be capable of being moved vertically to open or close the same, and also moved horizontally in its plane so as to produce a ventilating slot at one upright edge of the window, and an operating mechanism for said window comprising a pair of rock arms provided with parts that engage elongated guideways in a member attached to the lower edge of the window, the said part on one of said rock arms being arranged so as to co-operate with its co-acting guideway to move the window horizontally in its plane in opposite directions when the window is in its substantially fully raised position.

10. The combination of a vehicle window, a runway therefor, regulator mechanism for raising and lowering said window and moving the same longitudinally of the vehicle in opposite directions when the window is raised thereby to provide and close a ventilating opening through which air may be withdrawn from the vehicle, and means including a part movable with the regulator mechanism for blocking longitudinal movement of the window by a force exerted directly against the window when in raised position.

11. The combination of a vehicle window, a runway therefor, regulator mechanism for raising and lowering said window and moving the same longitudinally of the vehicle in opposite directions when the window is raised thereby to provide and close a ventilating opening through which air may be withdrawn from the vehicle, and means controlled by said regulator mechanism for blocking said longitudinal movement of the window by a force exerted directly against the window when in raised position.

12. The combination of a vehicle window, a runway therefor, regulator mechanism for raising and lowering said window and moving the same longitudinally of the vehicle in opposite directions when the window is raised thereby to provide and close a ventilating opening through which air may be withdrawn from the vehicle, and said regulator mechanism including means for holding said window while in closed position from vertical and longitudinal movements against a force exerted directly against the window.

13. A vehicle body or the like having a window opening provided with a relatively shallow glass runway at its forward upright edge and a relatively deep glass runway at its rear upright edge, a single glass panel slidable in said runways and adapted to fully close said opening, and regulator mechanism having a single manual control for raising and lowering the glass in said runways and also for sliding the glass in its plane longitudinally of the vehicle into and out of engagement with said forward runway to close and open a ventilating slot between the forward edge of the glass and said forward runway while maintaining the rear edge of the glass within said deep glass runway.

14. A vehicle body or the like having a window opening provided with a relatively shallow glass runway at its forward upright edge and a relatively deep glass runway at its rear upright edge, a single glass panel slidable in said runways and adapted to fully close said opening, regulator mechanism having a single manual control for raising and lowering the glass in said runways and also for sliding the glass in its plane longitudinally of the vehicle into and out of engagement with said forward runway to close and open a ventilating slot between the forward edge of the glass and said forward runway while maintaining the rear edge of the glass within said deep glass runway, and means cooperating with a part of said regulator mechanism for locking the glass against longitudinal movement by a force exerted directly on the glass.

15. Window regulator mechanism for a vehicle body having a window opening and a window glass slidable substantially vertically therein and also longitudinally of the body in the plane of the glass into and out of position to provide a ventilating slot at one upright edge of the glass, comprising a swinging arm connected to the lower edge of the glass for raising and lowering the same, and means cooperating with said arm for shifting the glass in opposite directions longitudinally of the body in the plane of the glass into and out of said ventilating position when the glass is in an elevated position.

16. Window regulator mechanism for a vehicle body having a window opening and a window glass slidable substantially vertically therein and also longitudinally of the body in the plane of the glass into and out of position to provide a ventilating slot at one upright edge of the glass, comprising a swinging arm connected to the lower edge of the glass for raising and lowering the same, means cooperating with said arm for shifting the glass in opposite directions longitudinally of the body in the plane of the glass into and out of said ventilating position when the glass is in an elevated position, and means mounted on the glass and cooperating with a part on said arm for blocking longitudinal movement of the glass by a force exerted directly against the glass.

17. Window regulator mechanism for a vehicle body having a window opening and a window glass slidable substantially vertically therein and also longitudinally of the body in the plane of the glass into and out of position to provide a ventilating slot at one upright edge of the glass, comprising a swinging arm connected to the lower edge of the glass for raising and lowering the same, means cooperating with said arm for shifting the glass in opposite directions longitudinally of the body in the plane of the glass into and out of said ventilating position when the glass is in an elevated position, and means including a cam cooperating with a part on said arm for blocking longitudinal movement of the glass by a force exerted directly against the glass.

18. Window regulator mechanism for a vehicle body having a window opening and a window glass slidable substantially vertically therein and also longitudinally of the body in the plane of the glass into and out of position to provide a ventilating slot at one upright edge of the glass, comprising regulator mechanism for raising and lowering the glass, a stop engageable by a part of said mechanism for shifting the glass longitudinally in its plane into or out of said ventilating position, and cam means for blocking longitudinal movement of the glass by a force exerted directly on the glass.

19. Window regulator mechanism for a vehicle body having a window opening and a window glass slidable substantially vertically therein and also longitudinally of the body in the plane of the glass into and out of position to provide a ventilating slot at one upright edge of the glass, a retainer member secured to the lower edge of the glass, regulator mechanism for raising and lowering the glass, a stop on said member cooperating with a part of said mechanism for shifting the glass longitudinally into or out of said ventilating position, and means for blocking said glass against longitudinal movement by a force applied directly to the glass.

20. Window regulator mechanism for a vehicle body having a window opening and a window glass slidable substantially vertically therein and also longitudinally of the body in the plane of the glass into and out of position to provide a ventilating slot at one upright edge of the glass, a retainer member secured to the lower edge of the glass, regulator mechanism for raising and lowering the glass, a stop on said member cooperating with a part of said mechanism for shifting the glass longitudinally into or out of said ventilating position, and means including an inclined cam surface for blocking said glass against longitudinal movement by a force applied directly to the glass.

21. Window regulator mechanism for a vehicle body having a window opening and a window glass slidable substantially vertically therein and also longitudinally of the body in the plane of the glass into and out of position to provide a ventilating slot at one upright edge of the glass, a retainer member secured to the lower edge of the glass, regulator mechanism for raising and lowering the glass, stop means on said member cooperating with said mechanism for shifting the glass longitudinally in opposite directions, and an inclined cam for blocking said glass against longitudinal movement when in predetermined elevated position.

22. Window regulator mechanism for a window glass mounted in the window frame of a vehicle body comprising a retainer member secured to the lower edge of the glass, a swinging regulator arm, said member and arm having cooperating parts including a horizontal guideway and a projecting device slidable in the guideway for raising and lowering the glass, said guideway terminating in an angular portion adapted to be engaged by said device for shifting the glass horizontally in its plane when the glass is in elevated position.

23. Window regulator mechanism for a window glass mounted in the window frame of a vehicle body comprising a retainer member secured to the lower edge of the glass, a swinging regulator arm, said member and arm having cooperating parts including a horizontal guideway and a projecting device slidable in the guideway for raising and lowering the glass, said guideway terminating in an angular portion adapted to be engaged by said device for shifting the glass horizontally in its plane when the glass is in elevated position, a separate movable member pivoted to the retainer member and having a slot to receive said device, the slot being out of alignment with the guideway and adapted to lock said device in the guideway.

24. Window regulator mechanism for a window glass mounted in the window frame of a vehicle body for vertical movement and also horizontal sliding movement in the plane of the glass into and out of position to provide a ventilating slot at the forward edge of the glass, a retainer member secured to the lower edge of the glass and having a horizontal guide slot terminating in successive guideway portions at an angle to each other, a swinging regulator arm having a projecting stud slidable in said guide slot and guideway portions, said stud being adapted to engage one of said portions to shift the glass horizontally in its plane and having a lost motion in the other portion when the glass is in an elevated position, said last-named guideway portion engaging said stud to block longitudinal movement of the glass as a result of a force applied directly to the glass.

25. In a window ventilating mechanism for a vehicle body, a retainer member secured to the lower edge of a window glass, a pair of swinging arms having devices cooperating with said retaining member for raising and lowering the glass, means on said member cooperating with one of said devices for shifting the glass horizontally in its plane when in raised position, and means carried by said member and cooperating with one of said devices for locking the glass against tilting movement in its plane.

26. In a window ventilating mechanism for a vehicle body, a retainer member secured to the lower edge of a window glass, a pair of swinging arms having devices carried by said arms and cooperating with said retainer member for shifting the window both vertically and horizontally in its plane, and means for locking said devices to the retainer member except when said arms are moved to shift the glass.

27. A vehicle body having a window opening, a sliding panel for closing said opening, a plate by which said panel is carried, said plate having two slots, one of said slots including a substantially straight horizontal portion and a substantially vertical portion, the other of said slots comprising a substantially straight horizontal portion communicating with an arcuate portion, and regulator mechanism including two intergeared swinging arms having studs working in said slots respectively.

28. The combination in a vehicle body having a window and a runway therefor, of regulator mechanism adapted to be connected to said window for raising and lowering the window and moving the same transversely in the plane of the window in opposite directions when the window is raised, thereby to provide and close a ventilating opening at one upright edge of the window through which air may be withdrawn from the vehicle, and a single manual control for said mechanism.

MILLARD H. TONCRAY.